Patented May 15, 1923.

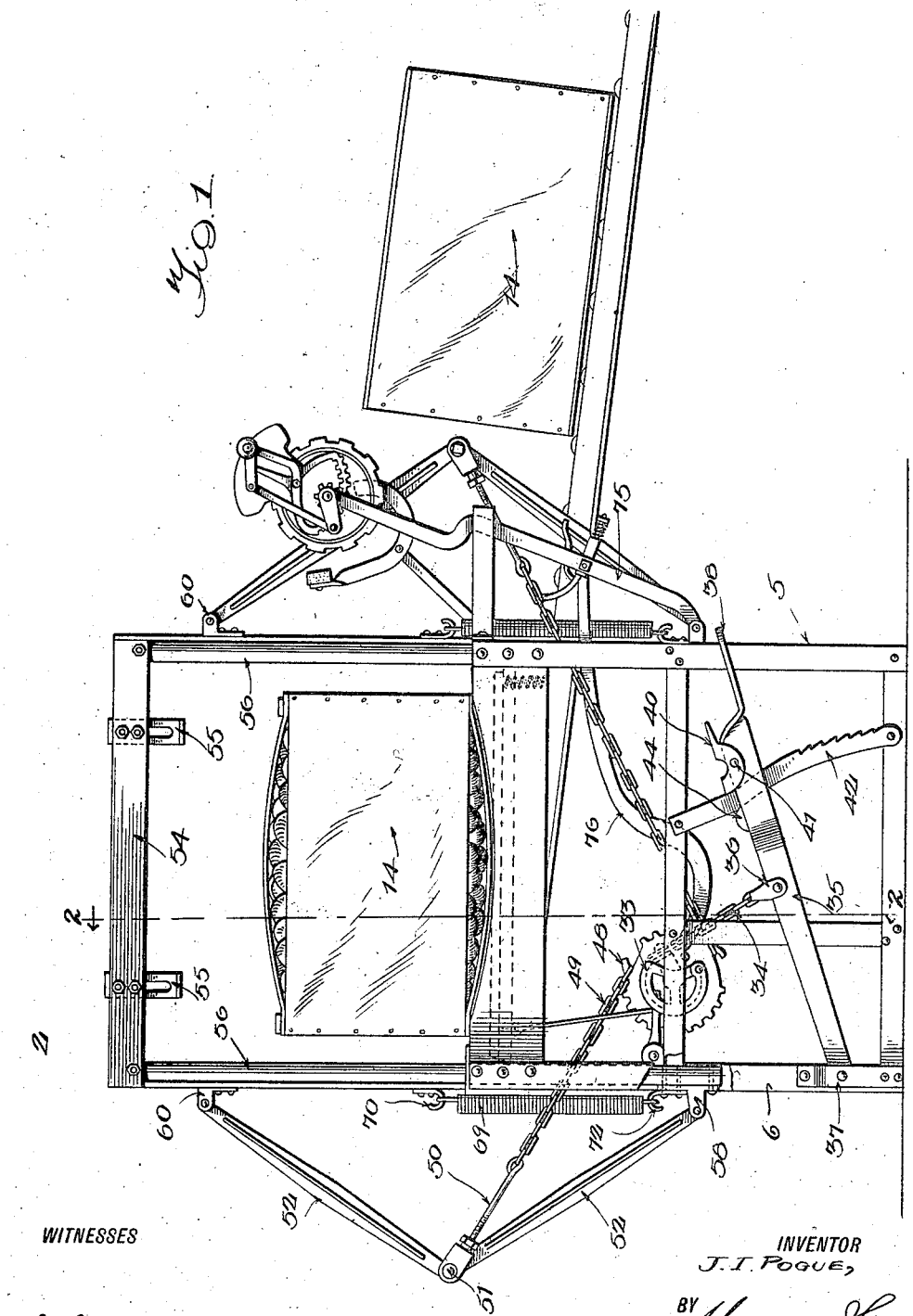

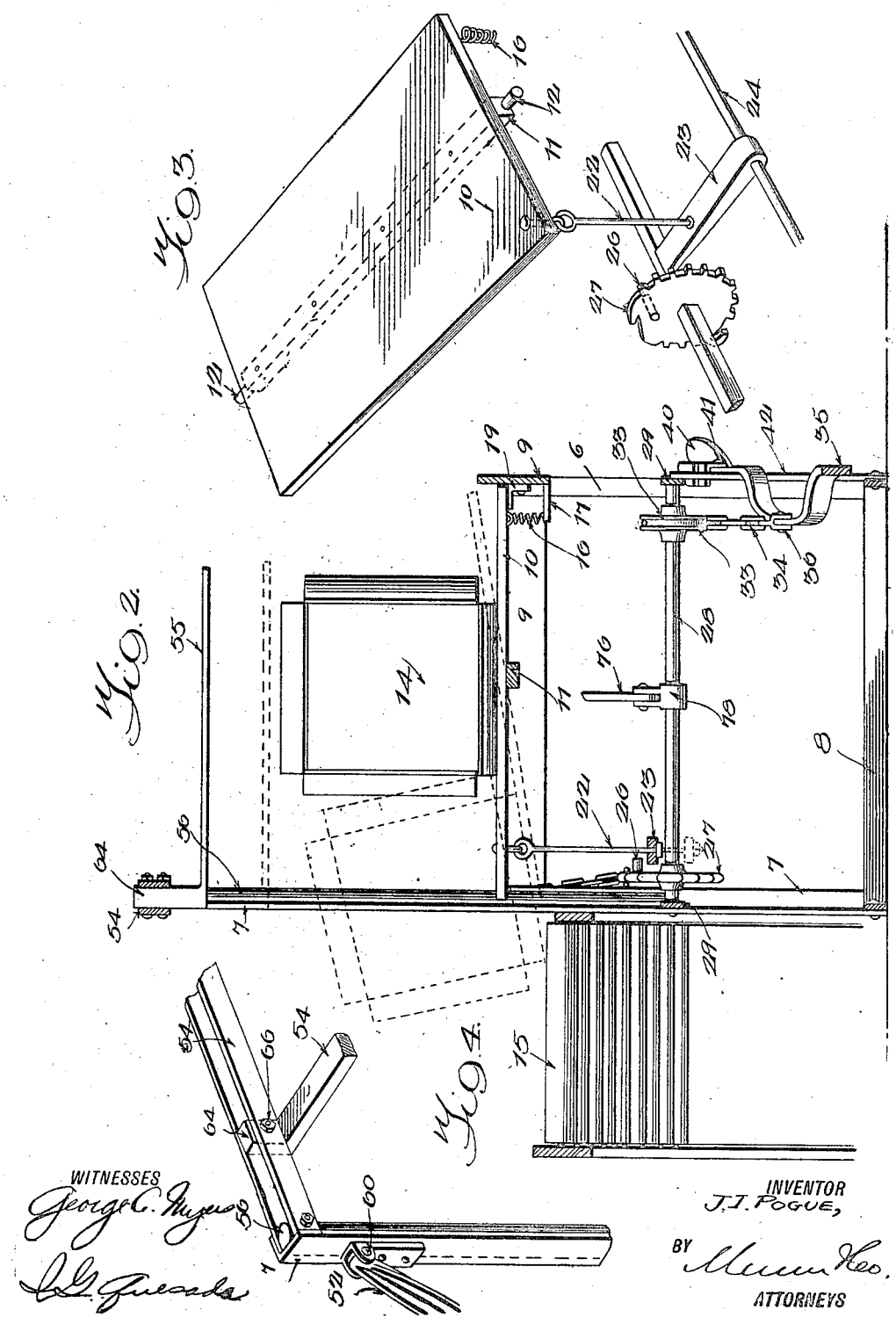

1,455,304

UNITED STATES PATENT OFFICE.

JOSEPH IRWIN POGUE, OF OMAK, WASHINGTON.

PRESS.

Application filed March 30, 1922. Serial No. 548,005.

*To all whom it may concern:*

Be it known that I, JOSEPH IRWIN POGUE, a citizen of the United States, and resident of Omak, in the county of Okanogan, in the State of Washington, have invented certain new and useful Improvements in Presses, of which the following is a specification.

This invention relates to fruit box presses and is a continuation in part of my pending application S. N. 328,784 filed October 6, 1919.

Briefly stated an important object of this invention is to provide a fruit box press and lidding machine having simple means whereby a pair of pressure arms may be brought into engagement with the lid of the fruit box with a uniform degree of pressure and which when in their operative position will not in any way interfere with the freedom of action of the nailer.

Further an important aim of this invention is to provide a fruit box and lidding machine having simple means whereby the box supporting platform is tilted upon the completion of the nailing operation so that the box is discharged onto a conveyor.

Also a further object is to provide a fruit box press and lidding machine which may be operated entirely by one person and which is of highly simplified construction, durable in use and cheap to manufacture.

Other objects and advantages of the invention will be apparent during the course of the following description.

In the accompanying drawings forming a part of this application and in which like numerals are employed to designate like parts throughout the same, Figure 1 is a front elevation of the improved fruit box press.

Figure 2 is a vertical transverse sectional view through the same, the view being taken on line 2—2 of Figure 1.

Figure 3 is a group perspective illustrating the tilting platform and the means for periodically tilting the same so that the box mounted thereon is discharged onto the conveyor arranged in rear of the machine.

Figure 4 is a fragmentary perspective of a cross head and one of the vertically movable members which supports the same, one of the pressure arms being shown connected to the cross head.

In the drawing wherein for the purpose of illustration is shown a preferred embodiment of the invention, the numeral 5 generally designates a frame which consists of front and rear legs 6 and 7 respectively, the said legs being formed preferably from angle iron and having their lower portions connected by strips 8. In carrying out the invention the rear legs 7 are as illustrated in Figure 2 extended considerably above the cross members 9 which join the front and rear legs.

As illustrated particularly in Figure 3 a box supporting platform 10 is provided at a point between its longitudinal edges with a rod 11 having its ends extended beyond the ends of the platform and formed with pivot pins 12 rotatably connected to the cross members 9 at opposite ends of the frame. It is thus seen that the platform is connected between its longitudinal edges to the frame in such a manner that the platform may tilt when it is desired to discharge the box 14 onto the inclined conveyor 15 at the completion of the nailing operation.

The platform 10 is normally held in a horizontal position by means of a pair of coiled springs 16 connected to the forward longitudinal edge portion of the platform and to laterally extending fingers 17 carried by the front cross member 9. The coiled springs 16 urge the forward longitudinal edge portion of the platform 10 into engagement with one or more stop lugs 19 carried by the front cross member 9 and the stop lugs 19 serve the obvious purpose of limiting the downward movement of the forward portion of the platform.

Before proceeding to the description of the means for holding the box and more particularly the lid of the same in position it might be stated that the rear longitudinal edge portion of the platform 10 is connected to a link 22 extended downwardly and freely slidable through a trip arm 23 mounted on a supporting rod 24. When the tripping arm 23 is moved downwardly the rear longitudinal edge portion of the platform 10 is moved downwardly so that the box of fruit thereon is discharged onto the conveyor 15.

The trip arm 23 is actuated by means of the laterally projecting lug 26 on a sprocket wheel 27, the said sprocket wheel being mounted on a squared shaft 28 rotatably carried by cross strips 29 secured to the front and rear legs of the frame. With reference to Figures 2 and 3 it will be seen that when the sprocket wheel 27 is rotated in a counterclockwise direction whereby the lug 26 will engage the terminal portion of the trip arm 23 and thereby tilt the platform 10. On the other hand when the sprocket wheel is rotated in a clockwise direction it will engage the under side of the trip 23 without imparting any movement whatever to the platform 10.

The squared shaft 28 has its forward end portion connected to what might be said to be a segmental sheave 33 having connection with a flexible element 34 preferably in the nature of a link chain, the said flexible element being connected to a treadle 35 by means of a U-shaped coupling member 36. With reference to Figure 1 it will be observed that the treadle lever 35 extends parallel to the front of the machine and has its lower end connected to the frame as indicated at 37. The upper portion of the lever 35 is formed with a foot pedal 38 by means of which the lever may be depressed when it is desired to rock the shaft 28.

In carrying out the invention the treadle lever 35 is provided with a gravity actuated pawl or dog 40 pivoted to the lever as indicated at 41 and having its forward portion extended beyond the rack 42 to provide a weight 44 by means of which the intermediate portion of the dog is normally held in engagement with the teeth of the rack 42. That is to say the forward portion 44 of the dog 40 is extended beyond the rack and the offset intermediate portion of the dog 40 is thereby normally held in engagement with the teeth on the rack so that the treadle levers 35 are held in a set position.

When it is desired to release the lever 35 from engagement with the rack, it is merely necessary to manually depress the rear portion of the dog 40 and thereby release the dog from engagement with the teeth on the ratchet wheel, whereupon a pair of springs to be more fully hereinafter described elevate the lever 35 through an indirect connection with the same.

The sprocket wheel 27 is provided with two oppositely arranged eccentric series of teeth and at one end of each set of teeth there is provided a hook 48 having engagement with the lower terminal links of chains 49. Figure 1 illustrates that the chains 49 are connected by means of adjustable links 50 to the pins or pivot elements 51 which connect pairs of toggle links 52.

It will be seen that when the treadle 38 is depressed the sheave 33 will be rotated in a clockwise direction for causing the sprocket wheel to rotate in a similar direction. The rotation thus imparted to the sprocket wheel will train the chain 49 about the same and of course the chains are thus drawn inwardly. When the chains 49 are drawn inwardly the pivot elements 51 and consequently the adjacent portions of the toggle links 52 are drawn inwardly whereby to cause the pressure head 54 to move downwardly and thereby engage the pressure arm 55 with the lid of the box. The pressure head 54 is movable vertically and is rigidly and permanently connected at its end to a pair of vertically movable rods 56 which are guided by the upwardly extended portions of the rear legs 7. The lower portions of the rods 56 are provided with laterally projecting ears 58 pivoted to the lower portions of the lower toggle links 52 so that when the chains 49 are drawn inwardly the lower toggle links 52 will be moved downwardly and inwardly whereby the rods 56 will be moved downwardly.

The upper toggle links 52 are pivoted to brackets 60 permanently and rigidly secured to the extended portions of the rear legs 7. It is thus seen that the inward movement of the chains 49 of which there are two will draw the lower toggle links 52 inwardly and downwardly with great force so that the pressure head 54 is forced downwardly whereby the forwardly extending arms 55 are forcibly engaged with the lid of the box.

As illustrated in Figure 4 the cross head consists of front and rear strips arranged in spaced parallel relation to receive the upwardly extending terminal portions 64 of the pressure arms 55 and suitable fastening devices such as bolts 66 are extended through the front and rear strips and the terminal portions 64 whereby to securely and positively connect the arms to the pressure head.

When the dog 40 is released and the operator removes his foot from the foot engaging portion 38 a pair of coiled springs 69 are caused to elevate the rods 56 and consequently the pressure head 54. The upper portions of the coiled springs 69 are connected by means of hooks 70 to the extended portions of the rear legs 7 and the lower portions of the coiled springs 69 are connected by hooks 72 to the lower portions of the rods 56 and this construction causes the rods 56 to promptly return to their elevated positions, upon being released.

A stamping or marking mechanism, generally designated by the numeral 75 is pivoted to one end of the frame and is actuated by means of a link 76 connected to the shaft 28 by means of the attaching member 78 and when the shaft 28 is rotated in the proper direction, the proper parts of the stamping mechanism will be swung into engagement with the fruit box for marking the grade and variety of the fruit. This feature however, is claimed in my copending application S. N. 491,409 filed August 11, 1921, and the specific construction of the stamper forms no part of this invention.

In operation the fruit box is positioned on the platform 10 which is as previously stated normally held in a horizontal position. It will be seen that it is not necessary to accurately position the box on the tilting platform as the arms are of ample length to engage the top regardless of the position of the box. Further it will be seen that the stamping mechanism and the pressure arm and the pressure head do not in any way interfere with the nailing of the box so that when the arms are swung downwardly for tightly compressing the fruit the nailer may expeditiously lid the box.

Of course during the nailing operation the treadle lever 35 is held in its downward position by means of the dogs 40 and when the stamping and nailing operations have been completed the treadle 35 is released and the springs 69 arranged at the ends of the same instantly return the rods 56 and consequently the pressure arms, to their elevated positions. The return movement of the sprocket wheel 27 causes the lug 26 to depress the trip arm 23 and thereby tilt the platform 10. Upon the platform 10 being tilted about the horizontal axis, the box ladened with fruit is discharged out through the rear side of the frame onto the inclined conveyor 15.

With reference to the foregoing description taken in connection with the accompanying drawings it will be seen that a fruit box lidding machine constructed in accordance with this invention may be operated entirely by one person and the boxes expeditiously stamped and lidded or nailed. In the practice of this invention it has been found that as many as three hundred boxes an hour may be nailed and stamped.

With reference to Figure 1 it will be seen that the pedal 38 is within convenient reach of the foot of the operator and may be detached by a slight movement of the foot and further the pedal may be released by a slight movement of the dog 40.

Having thus described the invention, what I claim is:—

1. A box press comprising a frame, a tiltable platform carried thereby, a link connected to the platform, and means to periodically move said link longitudinally whereby to tilt said platform.

2. A box press comprising a frame, a tiltable platform carried thereby, a presser head arranged above the platform and having rods, a rotatable wheel carried by the frame, a flexible element trained about the wheel and having connection with said rod whereby to periodically depress the same, and means operated by said wheel for periodically tilting said platform.

3. A box press comprising a frame, a tiltable platform supported thereby, a presser head adapted for pressing the cover of a box into position, a shaft carried by the frame and having a wheel, means connecting the wheel and the presser head whereby the rotation of the wheel will depress the presser head, a lug carried by the wheel, a trip arm periodically engaged by the lug, and a tripping link operated by the arm and connected to said platform whereby to periodically tilt the platform.

4. A fruit box press comprising a frame, a platform carried thereby and having means whereby the same may be moved about a horizontal axis, means for pressing the lid into place, foot operated means for actuating said first named means, and a tripping device operated by said second named means for tilting said platform about a horizontal axis, whereby to discharge the box mounted thereon.

5. A fruit box press comprising a frame, a platform carried thereby, pivot elements connected to the platform between its longitudinal edges and horizontally pivoted to the frame whereby the platform may swing about a horizontal axis, and a tripping device for swinging said platform about a horizontal axis, whereby the box mounted thereon may be discharged.

6. A fruit box press comprising a frame, a platform carried thereby, pivot elements connected to the platform between its longitudinal edges and horizontally pivoted to the frame whereby the platform may swing about a horizontal axis, a tripping device for swinging said platform about a horizontal axis, whereby the box mounted thereon may be discharged, pressure means to hold the lid on the box, and foot operated means for actuating said pressure means and said tripping device.

7. A fruit box press comprising a frame, a platform carried thereby, pivot elements connected to the platform between its longitudinal edges and horizontally pivoted to the frame whereby the platform may swing about a horizontal axis, a tripping device for swinging said platform about a horizontal axis, whereby the box mounted thereon may be discharged, pressure means to hold the lid on the box, foot operated means for actuating said pressure means and said tripping device, and means to normally hold said platform in a horizontal position.

8. A fruit box press comprising a frame having guide members, rods associated with said guide members, a pressure head connected to said rods, toggle links pivoted to said frame and to said rods, flexible members connected to said toggle links for drawing the same inwardly and consequently drawing said rods downwardly, a plurality of coiled springs connected to said frame and to said rods for normally holding the pressure head in an elevated position, and operating means whereby to draw said flexible elements inwardly, a tiltable platform supported by said frame, and a tripping device for said platform operated by said means.

9. A fruit box press comprising a frame having guide members, rods associated with said guide members, a pressure head connected to said rods, toggle links pivoted to said frame and to said rods, flexible members connected to said toggle links for drawing the same inwardly and consequently drawing said rods and the pressure head thereof downwardly, a plurality of coiled springs connected to said frame and to said rods for normally holding the pressure head in an elevated position, operating means whereby to draw said flexible elements inwardly, a tiltable platform supported by said frame, a tripping device for said platform operated by said means, and a locking device associated with said frame.

10. A fruit box press comprising a frame, a platform tiltably carried thereby, a depending link connected to said platform, a tripping arm slidably connected to said link, and a rotatable lug adapted to engage said tripping arm whereby to tilt the platform.

11. A fruit box press comprising a frame, a platform pivoted between its longitudinal edges to the frame for horizontal movement about an axis, a pressure head having means to press the cover on the box, rods connected to said pressure means, a rotatable member for operating said rods and having a laterally projecting lug, a link depending from said platform and having a stop element, a tripping arm slidably connected to said link and arranged in the path of travel of said lug whereby the engagement of the lug with one side of said trip arm engages the arm with the stop element and tilts said platform, and means to normally hold the platform in a horizontal position.

JOSEPH IRWIN POGUE.